(12) United States Patent
Han et al.

(10) Patent No.: US 11,920,031 B1
(45) Date of Patent: Mar. 5, 2024

(54) HIGH ULTRAVIOLET BLOCKING POLYLACTIC ACID COMPOSITE MATERIAL REINFORCED BY POSS MODIFIED BAMBOO POWDER AND A PREPARATION METHOD THEREFOR

(71) Applicant: XIHUA UNIVERSITY, Chengdu (CN)

(72) Inventors: Rui Han, Chengdu (CN); Taibi He, Chengdu (CN); Gang Chen, Chengdu (CN); Guangzhao Li, Chengdu (CN); Wenyan Wang, Chengdu (CN); Shuai Zhang, Chengdu (CN); Zhongzui Wang, Chengdu (CN)

(73) Assignee: XIHUA UNIVERSITY, Chengdu (CN)

( * ) Notice: Subject to any disclaimer, the term of this patent is extended or adjusted under 35 U.S.C. 154(b) by 0 days.

(21) Appl. No.: 18/211,928

(22) Filed: Jun. 20, 2023

(30) Foreign Application Priority Data

Aug. 30, 2022 (CN) .......................... 202211050350.X

(51) Int. Cl.
*C08L 67/04* (2006.01)
*C08J 5/04* (2006.01)

(52) U.S. Cl.
CPC ................ *C08L 67/04* (2013.01); *C08J 5/045* (2013.01); *C08J 2367/04* (2013.01); *C08L 2201/06* (2013.01); *C08L 2201/08* (2013.01); *C08L 2205/16* (2013.01)

(58) Field of Classification Search
None
See application file for complete search history.

(56) References Cited

U.S. PATENT DOCUMENTS

2017/0233899 A1* 8/2017 Kim .................. B33Y 70/00
264/308

OTHER PUBLICATIONS

Hu et al. (Enhanced UV-shielding performance of poly(lactic acid) composite with POSS-modified bamboo powder, Industrial Crops & Products 192 (2023) 116133) (Year: 2023).*
Extrusion (Second Edition) The Definitive Processing Guide and Handbook Plastics Design Library 2014, pp. 181-192. (Year: 2014).*

* cited by examiner

*Primary Examiner* — Robert T Butcher
(74) *Attorney, Agent, or Firm* — WPAT, P.C

(57) ABSTRACT

Disclosed is a high ultraviolet blocking polylactic acid composite material reinforced by POSS modified bamboo powder. The preparation method therefor includes steps of carrying out chemical grafting modification of bamboo powder with proper particle size by using POSS containing specific organic groups, and then adding the modified bamboo powder to polylactic acid for melting and co-extrusion to obtain POSS modified bamboo powder. The present disclosure makes full use of the 30% lignin in the bamboo powder, having the advantages of wide source, biological metabolizability and low price; the present disclosure does not need the traditional inorganic ultraviolet blocking agent, nor need to extract refined lignin from natural materials, but directly takes inexpensive and easy-to-obtain bamboo powder as main raw material. The composite material prepared in the present disclosure can greatly improve the UV blocking performance, mechanical properties and thermal stability of the PLA.

7 Claims, 2 Drawing Sheets

HIGH ULTRAVIOLET BLOCKING POLYLACTIC ACID COMPOSITE MATERIAL REINFORCED BY POSS MODIFIED BAMBOO POWDER AND A PREPARATION METHOD THEREFOR

TECHNICAL FIELD

The present disclosure relates to the technical field of new materials, in particular to a high ultraviolet blocking polylactic acid composite material reinforced by POSS modified bamboo powder and a preparation method therefor.

BACKGROUND

Ultraviolet (UV) is harmful electromagnetic wave with a wavelength range of 200-400 nm, and can be divided into three bands of UVC (200-280 nm), UVB (280-320 nm) and UVA (320-400 nm) according to the wavelength. Specifically, the UVC band is chiefly absorbed by an ozone layer, while the UVB and UVA bands can cause chronic damage to human skin, food, materials, and the like. Polylactic acid (PLA) is the most commonly used biodegradable polymer today, and has been widely used in packaging materials, but the PLA has relatively low crystallinity, poor thermal stability, easy to be brittle and poor UV blocking performance. Therefore, it is difficult to effectively protect items packed by packaging materials or various containers made from the PLA from being damaged by the UV during long-term transportation and storage.

To solve the above problems, the existing main strategy and method are to add UV-blocking agents, including organic and inorganic ones, to the PLA, among which the most commonly used ones are inorganic materials, including $TiO_2$, $CeO_2$, $ZnO$, $Al_2O_3$, and the like. These blocking agents, on the one hand, cannot absorb UV rays of all bands due to wide band gaps, and a great amount of such agents are added; on the other hand, mechanical properties of PLA-based composites are deteriorated because of great differences between surface chemical properties and a PLA matrix; and most importantly, these blocking agents have a certain photocatalytic activity, which can easily cause UV catalytic degradation of the PLA in a long term use process.

Therefore, the use of UV-blocking agents made from natural raw materials has risen in recent years, which not only can improve the ability of the PLA to block UV rays, but also can be metabolized together with the PLA by environment due to their biomass properties, thereby retaining environmental friendly characteristics of discarded PLA products. Currently, the most common type of UV-blocking agents is lignin (a natural organic substance), which demonstrates a strong UV-blocking ability in spite of a low content. However, the process of purifying the lignin from wood and biomass materials is very complicated, and a variety of chemical reagents need to be used, which delivers a great negative impact on the environment; meanwhile, the color of the lignin is darker, and the visible light transmittance of PLA will be greatly influenced after the lignin is compounded with PLA.

Further, at present, some reports also indicate that the mechanical properties and the UV-blocking performance of the PLA can be improved by melt-mixing the modified bamboo fibers with the PLA, for example, the Chinese patent, entitled "Preparation Method of Antioxidant Uvioresistant Fully-degradable Composite Material Made from Bamboo Fiber Reinforced Polylactic Acid and Composite Material" with Publication No. CN 114621473A, discloses the above composite material, which is prepared by the following steps: first, bamboo fibers are subjected to microwave-assisted acetylation modification, then the modified bamboo fibers are subjected to the melt-mixing with polylactic acid, together with an antioxidant, titanium dioxide and other functional auxiliaries, to obtain a highly-filled composite material with the tensile strength being greater than 68 MPa, the bending strength being greater than 110 MPa, the oxidation induction time being more than 45 min, and the 300 nm wavelength UV blocking rate being greater than 99%. However, bamboo fiber is a new type of regenerated cellulose fiber, which is made from bamboo pulp using moso bamboos as raw materials by adding functional additives and processed by the wet spinning method. The bamboo fiber is in fibrous form and a secondary processing product unable to be directly obtained, a great amount of reagents needs to be used during the processing, and the processing will generate a large amount of waste pulp, causing a serious burden to the environment. Cellulose in the bamboo fibers takes up a higher proportion than that of the raw bamboo, moreover, it is only capable of realizing UV blocking at a fixed wavelength of 300 nm, proving a relatively poor practicality.

Therefore, identifying and preparing a new type of UV blocking agent based on natural substances and compounding it with the PLA to prepare high-performance ultraviolet blocking degradable plastics are beneficial to promoting the development of the environmentally-friendly plastics industry and improving the environmental quality.

SUMMARY

One of objectives of the present disclosure is to provide a preparation method of a high ultraviolet blocking polylactic acid composite material reinforced by POSS modified bamboo powder, so as to solve the above problems.

To implement the above objective, the present disclosure adopts the following technical solution: a preparation method of a high ultraviolet blocking polylactic acid composite material reinforced by POSS modified bamboo powder, including the following steps:

(1) Adding bamboo powder with particle sizes ranging from 400-2,000 meshes to 0.5-0.8 mol/L NaOH solution, stirring for 3-5 h at temperatures of 70-80° C., and drying to remove the solvent;

(2) Adding modified POSS into a tetrahydrofuran solvent under stirring, where the proportion of the modified POSS to the tetrahydrofuran solvent ranges from 1 g: 200 mL-1 g: 400 mL, after stirring evenly, adding the bamboo powder obtained in the S(1) to the same tetrahydrofuran solvent, the proportion of the bamboo powder obtained in the S(1) to the tetrahydrofuran solvent ranges from 1 g: 20 mL-1 g: 40 mL, continuously stirring the solution for 3-4 h at temperature of 50-80° C., during which a condensation reflux device was used to prevent solvent loss;

(3) Upon completion of the stirring reaction, filtering a reaction product and washing it with a tetrahydrofuran solvent, and drying to remove the solvent to obtain POSS modified bamboo powder (POSS-BP); and (4) Mixing the POSS-BP obtained in the S(3) with polylactic acid according to a mass ratio of 2:98-10:90, that is, the adding proportion of the POSS-BP is 2 wt %-10 wt %, after mixing evenly, carrying out the melt-mixing and co-extrusion, cooling and pelletizing in a water bath and then drying to obtain the composite material.

In the present disclosure, POSS and the surface of bamboo powder are subjected to a grafting chemical reaction to obtain POSS modified bamboo powder, which is then used as a new type of biomass UV blocking to be melt-mixed with the PLA, and a PLA-based composite material product is prepared by the conventional thermoplastic processing method. The product has excellent UV blocking performance, high crystallinity, good mechanical properties and thermal stability.

Bamboo powder, one of raw materials used in the present disclosure, is directly obtained after raw bamboos are crushed or obtained from waste powder generated after the raw bamboo materials are physically processed, which contains about 30% lignin, and has the advantages of wide source, biological metabolizability and low price. Compared with the dark colored lignin, the bamboo powder in light yellow may endow the PLA-based composite material with better transparency. POSS stands for polyhedral oligomeric silsesquioxanes and is a new type of organic: inorganic hybrid material, the inner core of which is a cage-shaped structure consisting of Si—O—Si bonds, and a large number of organic groups can be grafted on to the surface of the material. The material has excellent thermal stability and mechanical properties, and can enhance the compatibility with polymers through the organic groups on the surface thereof. Through simple chemical reactions, the present disclosure successfully grafts the POSS on to the surface of the bamboo powder, and prepares a biomass UV blocking agent for the PLA with a tiny amount of POSS modified bamboo powder. Through the synergistic effect of bamboo powder and POSS, the UV blocking agent, with a tiny amount of addition, not only greatly improves the UV blocking performance of the PLA, but also strengthens the thermal stability, crystallinity, tensile modulus, tensile strength, elongation at break and other mechanical properties of the PLA, and better retains the transmittance of the PLA to visible light as well.

As a preferred technical solution: in the S(1), the particle size of commercially available bamboo powder is 800-1,000 meshes. When the particle size is too small, the bamboo powder is easy to self-agglomerate and is not conducive to thermal-melting processing (the bamboo powder is not easy to be evenly mixed with the PLA in a high-speed mixer and is not conductive to cutting during double-screw extrusion); while under the condition that the particle size is too large, chemical reaction activities of the bamboo powder will be reduced, and the PLA mechanical properties are easy to be deteriorated according to the dispersion strengthening principle.

As a preferred technical solution: in the S(1), stirring is carried out for 5 h at 80° C.

As a preferred technical solution: in the S(2), the modified POSS is selected from one or a mixture more of glycidyl modified POSS, methacrylic modified POSS and maleamic acid modified POSS.

As a further preferred technical solution, the modified POSS is glycidyl modified POSS.

As a preferred technical solution, in the S(2), the proportion of the modified POSS to the tetrahydrofuran solvent is 1 g: 400 mL, and the proportion of the bamboo powder obtained in the S(1) to the tetrahydrofuran solvent is 1 g: 40 mL.

As a preferred technical solution, in the S(4), a high-speed mixer is used to perform the mixing, and a double-screw extruder is used to perform the melt-mixing.

As a further preferred technical solution, when the melt-mixing is performed, the extrusion temperatures from the barrel to the die are 160° C., 180° C., 180° C. and 180° C., respectively, and the screw rotation speed is 120 rpm.

The second objective of the present disclosure is to provide a material prepared by the above method.

Compared with the prior art, the present disclosure has the advantages:

Through simple chemical reactions, the present disclosure successfully grafts the POSS on to the surface of the bamboo powder, and prepares a biomass UV blocking agent for the PLA with a tiny amount of POSS modified bamboo powder. Through the synergistic effect of bamboo powder and POSS, the UV blocking agent, with a tiny amount of addition, not only greatly improves the UV blocking performance of the PLA, but also strengthens the thermal stability, crystallinity, tensile modulus, tensile strength, elongation at break and other mechanical properties of the PLA, and better retains the transmittance of the PLA to visible light as well. Further, the present disclosure makes full use of the 30% lignin contained in the bamboo powder, having the advantages of wide source, biological metabolizability and low price. Moreover, compared with the dark colored lignin reported at present, the bamboo powder in light yellow adopted in the present disclosure may endow the PLA-based composite material with better transparency. Therefore, the composite material prepared in the present disclosure better retains the transmittance of the PLA to visible light;

(2) The present disclosure does not need the traditional inorganic ultraviolet blocking agent, nor need to extract refined lignin from natural materials, but directly takes inexpensive and easy-to-obtain raw bamboo powder as main raw material, and the blocking performance of the PLA on UVA and UVB bands has been greatly improved through micro-chemical modification of the POSS; and (3) The POSS-BP modified PLA composite material is prepared under mild conditions on the basis of compressively considering processing characteristics of the bamboo powder and the PLA, and related products are prepared by adopting various traditional thermoplastic processing methods.

BRIEF DESCRIPTION OF DRAWINGS

In FIG. 1: a. untreated bamboo powder; b. bamboo powder after POSS treatment; and c. EDS results of Si element distribution POSS treated bamboo powder.

DETAILED DESCRIPTION OF EMBODIMENTS

The present disclosure will be further described below with reference to the accompanying drawings.

In the following examples, unless otherwise specified, raw materials used were commercially available, specifically, commercial bamboo powder was purchased from Liu'an Xingzhu New Material Technology Co., Ltd. (Material: raw bamboo powder), and glycidyl group-modified POSS was purchased from Xi'an Qiyue Biology Co., Ltd.

Embodiment 1

Figure 1:
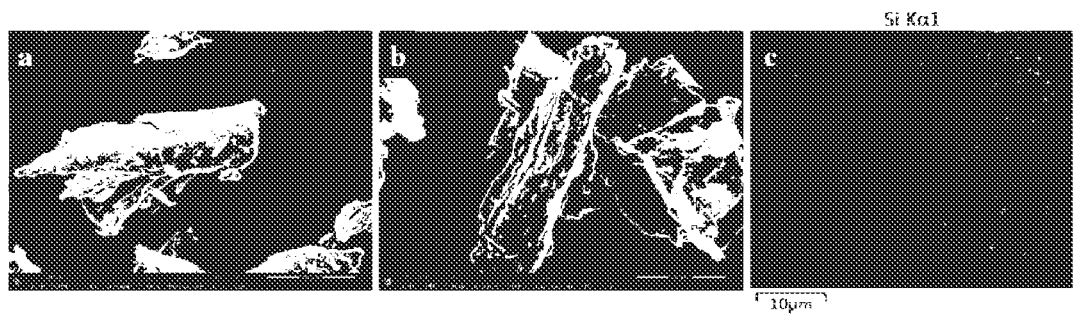
FIG. 1 is SEM pictures before and after modification treatment of bamboo powder and EDS picture after modification treatment.

A preparation method of a high ultraviolet blocking polylactic acid composite material reinforced by POSS modified bamboo powder, including the following steps:
(1) Commercially available bamboo powder (1,000 meshes) was added to 0.5 mol/L NaOH solution, which was stirred at 80° C. for 5 h, and then dried at 80° C. for 12 h until water was removed;
(2) Rapid stirring was performed at 500 rpm, glycidyl group-modified POSS and tetrahydrofuran at a proportion of 1 g (glycidyl group-modified POSS) to 400 ml (tetrahydrofuran) were added to a tetrahydrofuran solvent, the solution was stirred evenly, and the bamboo powder obtained in S(1) and tetrahydrofuran at a proportion of 1 g (bamboo powder) to 40 ml (tetrahydrofuran) were added to the above tetrahydrofuran solution, which was subjected to continuously rapid stirring at 70° C. for 4 h, during which a condensation reflux device was used to prevent solvent loss;
(3) Upon completion of the stirring reaction, a reaction product was filtered and then washed with a tetrahydrofuran solvent, and then dried at 80° C. for 12 h to obtain POSS modified bamboo powder (POSS-BP for short); and Micrographs before and after modification and EDS after modification were illustrated in FIG. 1. In FIG. 1, a illustrates untreated bamboo powder, b illustrates the bamboo powder after the POSS treatment in the present example, and c illustrates EDS results of Si element distribution of the bamboo powder after the POSS treatment in the present example. As can be seen in FIG. 1, the untreated bamboo powder has a smooth surface, but after the POSS treatment, the bamboo powder is covered with a film and rough on the surface. EDS results show that the surface of the modified bamboo powder contains a great amount of Si elements, and POSS has been successfully grafted on to the surface of the bamboo powder.

Figure 2:
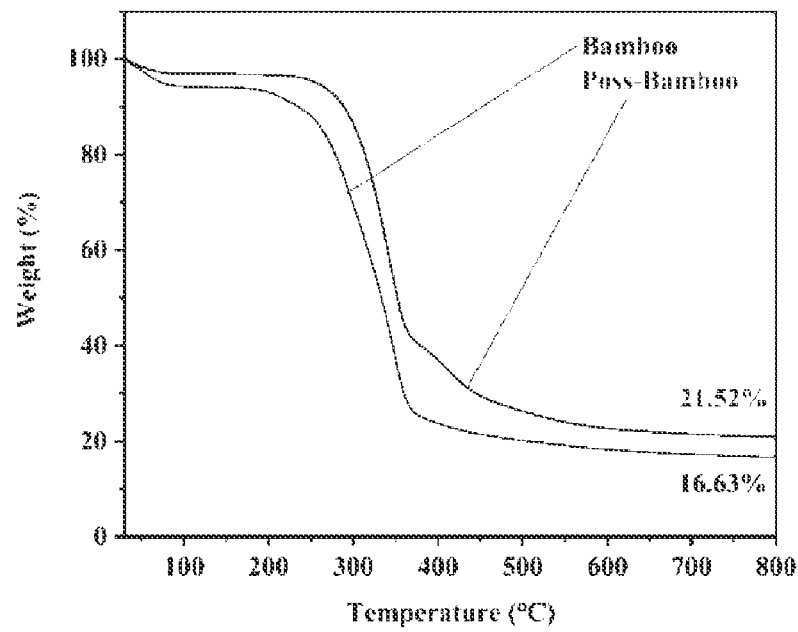
FIG. 2 illustrates the results of the temperature-rising thermogravimetry of conventional bamboo powder and the modified bamboo powder.

Results of the temperature-rising thermogravimetry of conventional bamboo powder and the modified bamboo powder in the present example are shown in FIG. 2. As can be seen in FIG. 2, compared with the conventional bamboo (Bamboo), the bamboo powder modified by glycidyl POSS (POSS-Bamboo) has a higher thermal decomposition temperature and demonstrates better thermal stability.

Figure 4:
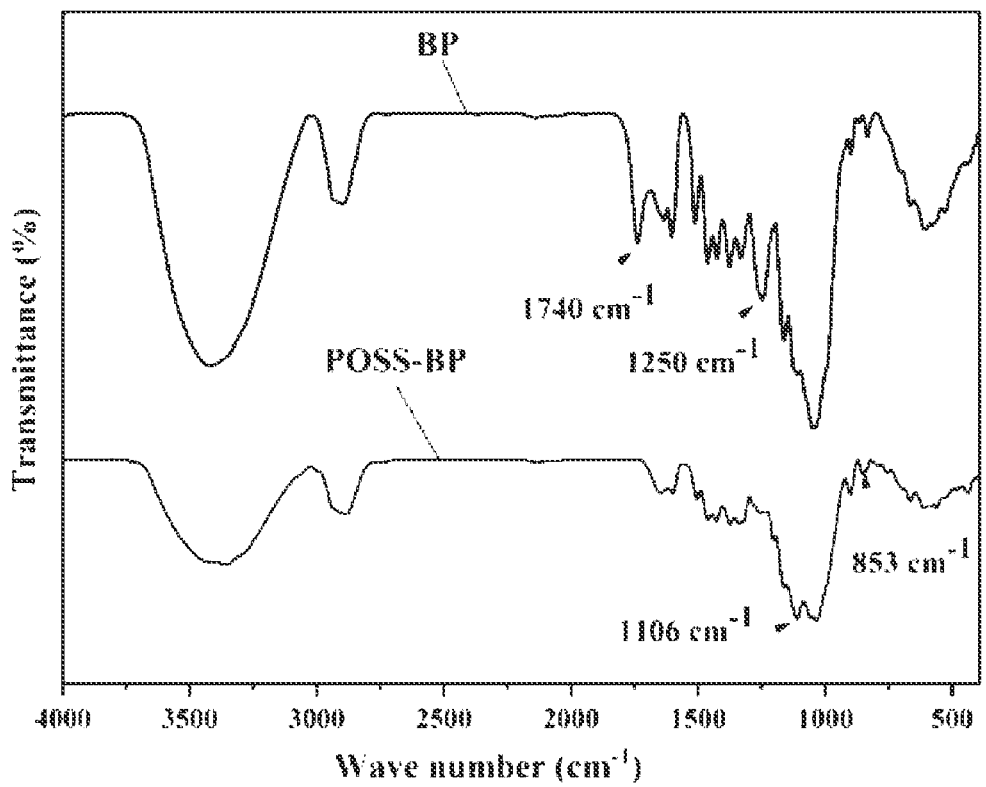
FIG. 4 illustrates infrared spectrograms before and after the modification of the bamboo powder.

Further, infrared spectrograms before and after the modification of the bamboo powder are shown in FIG. 4. As can be seen in FIG. 4: a wide characteristic absorption peak in the range of 3,026-3,800 $cm^{-1}$ is the stretching vibration absorption peak of —OH in the bamboo powder, an absorption peak with a shoulder peak at 2,910 $cm^{-1}$ is the symmetric and asymmetric stretching vibration absorption peak of methyl and methylene, also the characteristic absorption peak of cellulose, an absorption peak at 1,740 $cm^{-1}$ is the stretching vibration peak of carbonyl in hemicellulose and pectin, and an absorption peak at 1,250 $cm^{-1}$ is the stretching vibration peak of benzene rings and $CH_3$—CO— in the lignin;

The decrease of absorption peak intensity of the POSS-BP in the range of 3026-3800 $cm^{-1}$ is attributed to the reaction of —OH group in the bamboo powder with epoxy group of POSS, in FTIR spectrum of POSS-BP, the absorption peak at 1740 $cm^{-1}$ disappeared, because the NaOH solution reacted with the carbonyl in the hemicellulose and pectin during alkali treatment, the disappearance of the absorption peak at 1250 $cm^{-1}$ was attributed to the reaction of the $CH_3$—CO— in the lignin with the POSS, there were new absorption peaks at 1106 $cm^{-1}$ and 853 $cm^{-1}$ in the POSS-BP, which respectively correspond to the characteristic peaks of Si—O—Si and epoxy groups, demonstrating that the POSS was successfully grafted on to the BP through simple chemical reactions;
(4) The POSS-BP obtained in the S(3) and PLA were mixed evenly at a mass ratio of 10:90 by a high-speed mixer, and then melt-mixed and extruded by a double-screw extruder, with the extrusion temperature from the barrel to the die being 160° C. 180° C., 180° C. and 180° C., respectively, and the screw rotation speed being 120 rpm, and after being cooled and pelletized in a water bath and then vacuum-dried at 80° C. for 12 h, the POSS-BP modified PLA composite material was obtained; and
(5) The POSS-BP modified PLA composite material obtained in the S(4) was subjected to compression-mold to obtain samples for performance tests, the molding temperature was 190° C. the pressure was 20 MPa, and the hot pressing time was 5 min.

The performance tests was performed on the obtained samples:

Tensile test: tensile properties of the POSS-BP/PLA composite material were measured using an Instron 5566 electronic universal tensile machine. A dumbbell-shaped specimen cut out from a compression-molded sample was used, with a size of 75×4×1 $mm^3$, the tensile speed was 5 mm/min, and each group of samples was tested for 10 times to get the average value.

UV-blocking performance test: the POSS-BP/PLA composite material film with the average thickness of about 100 um was prepared by mold pressing, an ultraviolet-visible spectrophotometer (Agilent Cary 60) was used to scan the wavelength of the film in the range of 200-800 nm, the scanning resolution was 1 nm, and the test result was expressed in transmittance, where:

$$UVA \, blocking(\%) = 100 - \frac{\int_{320}^{400} T(\lambda)d\lambda}{\int_{320}^{400} d\lambda}(\%)$$

$$UVB \, blocking(\%) = 100 - \frac{\int_{280}^{320} T(\lambda)d\lambda}{\int_{280}^{320} d\lambda}(\%)$$

Thermal stability test: the samples were subjected to the analysis of temperature-rising thermogravimetry by using a TGA-209 F1 thermogravimetric analyzer of Netzsch Company, the heating range was 30-800° C., and the heating rate was 10° C./min.

The properties of the samples obtained were as follows:
The UVA blocking rate was 87.9%, the UVB blocking rate was 93.0%, and when the composite material suffered a thermogravimetry of 10%, the corresponding temperature was 373.6° C.; the tensile modulus was 1.87 GPa, the tensile strength was 87.9 MPa, and the elongation at break was 16.3%.

Figure 3:
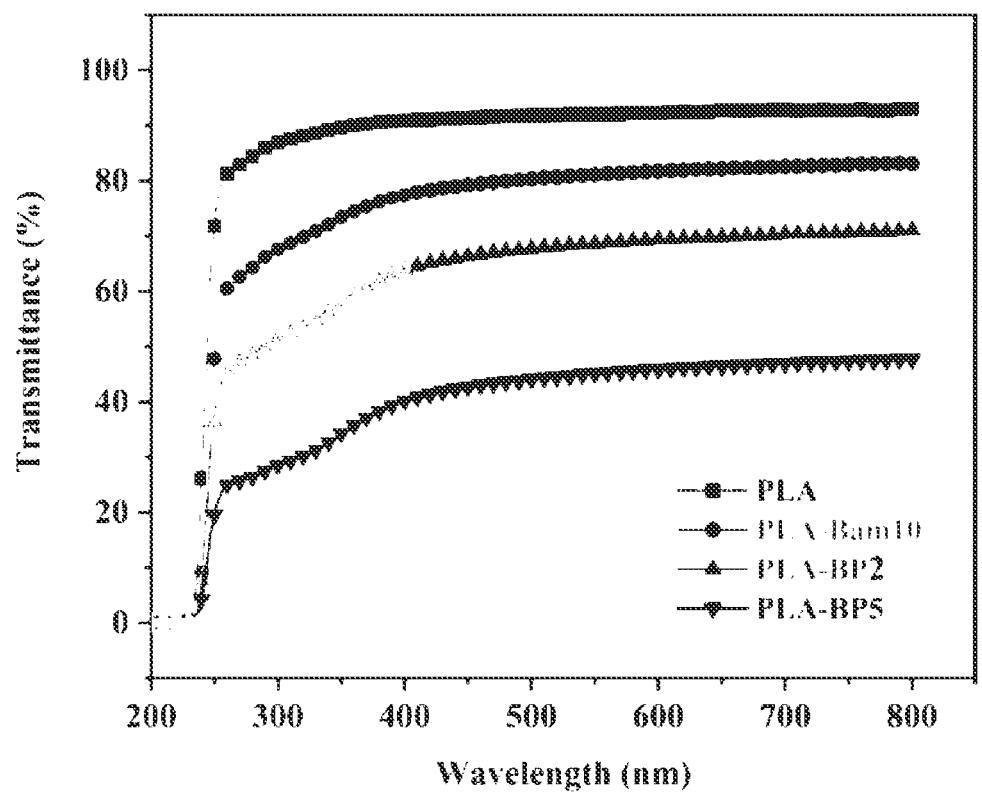
FIG. 3 illustrates the results of the transmittance test of different product at the wavelength of 200-800 nm.

FIG. 3 illustrates the results of the transmittance test of the composite materials prepared according to different addition ratio as described in the method of Example 1 at the wavelength of 200-800 nm, "PLA-BP2" in FIG. 3 indicates that the addition ratio of POSS-BP is 2 wt %, and soon. As can be seen in FIG. 3, after the glycidyl POSS modified bamboo powder is compounded with the PLA, the blocking performance of the PLA in the UV bands is significantly improved, the influence on the visible band transmittance is relatively small, and the considerable visible band transmittance is retained.

Example 2

Compared with Example 1, the particle size of commercially available bamboo powder in the present example was 2,000 meshes, and the rest were the same as those in Example 1.

Example 3

Compared with Example 1, the particle size of commercially available bamboo powder in the present example was 400 meshes, and the rest were the same as those in Example 1.

Example 4

Compared with Example 1, only the modified POSS was modified by using maleamic acid in the present example, and the rest were the same as those in Example 1.

Example 5

Compared with Example 1, glycidyl group-modified POSS and tetrahydrofuran at a proportion of 1 g (oxypropyl modified POSS) to 200 ml (tetrahydrofuran) were added to the above tetrahydrofuran solvent in the present example, and the rest were the same as those in Example 1.

Example 6

Compared with Example 1, the bamboo powder obtained in the S(1) and tetrahydrofuran at a proportion of 1 g (bamboo powder) to 20 ml (tetrahydrofuran) were added to the above tetrahydrofuran solvent in the present example, and the rest were the same as those in Example 1.

Relevant properties data of the products obtained in the Examples 2-6 above are given in the following table.

Table 1 Properties of the Materials Prepared in Examples 1-7.

Comparative Example 1

(1) Compared with Example 1, the S(1) to S(4) were cancelled, but the unmodified PLA was vacuum-dried at 80° C. for 12 h and directly subjected to compression molding to obtain samples for performance tests. The molding temperature was 190° C., the pressure was 20 MPa, and the hot pressing time was 5 min.

The properties of the samples obtained were as follows:

The UVA blocking rate was 10.0%, the UVB blocking rate was 13.0%, and when the composite material suffered a thermogravimetry of 10%, the corresponding temperature was 333.7° C.; the tensile modulus was 1.36 GPa, the tensile strength was 66.4 MPa, and the elongation at break was 6.3%.

Comparative Example 2

Compared with Example 1, the present Comparative Example adopted the same bamboo powder, but did not use the glycidyl modified POSS for modification in advance, that is, the bamboo powder was added to 0.5 mol/L NaOH solution, which was stirred at 80° C. for 5 h. and then dried at 80° C. for 12 h; then under the condition of rapid stirring, the bamboo powder obtained by the above treatment and tetrahydrofuran at a proportion of 1 (bamboo powder) to 40 ml (tetrahydrofuran) were added to the tetrahydrofuran solvent, which was subjected to continuously rapid stirring at 70° C. for 4 h, during which a condensation reflux device was used to prevent solvent loss; and the rest were the same as.

The properties of the samples obtained were as follows:

The UVA blocking rate was 25.6%, the UVB blocking rate was 33.7%, and when the composite material suffered a thermogravimetry of 10%, the corresponding temperature was 331.9° C.; the tensile modulus was 1.47 GPa, the tensile strength was 52.4 MPa, and the elongation at break was 4.3%.

What is described above is merely preferred embodiments of the present disclosure, and is not intended to limit the present disclosure. Any modifications, equivalent replacements and improvements, etc. made within the spirit and principle of the present disclosure should fall within the scope of protection of the present disclosure.

What is claimed is:

1. A preparation method of a high ultraviolet blocking polylactic acid composite material reinforced by polyhedral oligomeric silsesquioxanes (POSS) modified bamboo powder, comprising the following steps:

|  | UVA blocking rate (%) | UVB blocking rate (%) | Tensile modulus (GPa) | Tensile strength (MPa) | Elongation at break (%) | Temperature in case of 10% of thermogravimetry (° C.) |
|---|---|---|---|---|---|---|
| Example 1 | 87.9 | 93.0 | 1.87 | 87.9 | 16.3 | 373.6 |
| Example 2 | 78.4 | 85.0 | 1.80 | 79.6 | 12.3 | 369.1 |
| Example 3 | 73.3 | 78.0 | 1.67 | 71.6 | 10.9 | 359.8 |
| Example 4 | 85.4 | 90.2 | 1.85 | 85.9 | 15.7 | 372.3 |
| Example 5 | 81.6 | 87.7 | 1.74 | 78.8 | 11.6 | 363.4 |
| Example 6 | 80.1 | 83.6 | 1.76 | 76.2 | 11.1 | 366.8 |
| Comparative Example 1 | 10.0 | 13.0 | 1.36 | 66.4 | 6.2 | 333.7 |
| Comparative Example 2 | 25.6 | 33.7 | 1.47 | 52.4 | 4.3 | 331.9 |

(1) adding bamboo powder with particle sizes ranging from 400-2,000 mesh to 0.5-0.8 mol/L NaOH solution, stirring for 3-5 h at temperatures of 70-80° C., washing and filtering, and then drying to remove water;

(2) adding modified POSS into a tetrahydrofuran solvent under stirring, where the proportion of the modified POSS to the tetrahydrofuran solvent ranges from 1 g: 200 mL-1 g: 400 mL, after stirring evenly, adding the bamboo powder obtained in the step 1 to the same tetrahydrofuran solvent, the proportion of the bamboo powder obtained in the step 1 to the tetrahydrofuran solvent ranges from 1 g: 20 mL-1 g: 40 mL, continuously stirring the solution for 3-4 h at temperature of 50-80° C., during which a condensation reflux device is used to prevent solvent loss; and the modified POSS is selected from one or a mixture more of glycidyl modified POSS, methacrylic modified POSS and maleamic acid modified POSS;

(3) upon completion of the stirring reaction, filtering a reaction product and washing it with a tetrahydrofuran solvent, and drying to remove the tetrahydrofuran solvent to obtain POSS modified bamboo powder (POSS-BP); and (4) mixing the POSS-BP obtained in the step 3 with polylactic acid according to a mass ratio of 2: 98-10:90, after mixing evenly, carrying out the melt-mixing and co-extrusion, cooling and pelletizing in a water bath and then drying to obtain the POSS-BP modified PLA composite material.

2. The preparation method according to claim 1, wherein in the step 1, the particle size of commercially available bamboo powder is 800-1,000 mesh.

3. The preparation method according to claim 1, wherein in the step 1, stirring is carried out for 5 h at 80° C.

4. The preparation method according to claim 1, wherein the modified POSS is glycidyl modified POSS.

5. The preparation method according to claim 1, wherein in the step 2, the proportion of the modified POSS to the tetrahydrofuran solvent is 1 g: 400 mL, and the proportion of the bamboo powder obtained in the step 2 to the tetrahydrofuran solvent is 1 g: 40 mL.

6. The preparation method according to claim 1, wherein in the step 4, a high-speed mixer is used to perform the mixing, and a double-screw extruder is used to perform the melt-mixing.

7. A material prepared by the method according to claim 1.

\* \* \* \* \*